United States Patent

Smaller

[15] 3,699,269

[45] Oct. 17, 1972

[54] DOUBLE TRANSFER TAPE COPY SYSTEM

[72] Inventor: Philip Smaller, 4155 Wilkie, Palo Alto, Calif. 94306

[22] Filed: Sept. 30, 1971

[21] Appl. No.: 185,225

[52] U.S. Cl. ........................179/100.2 E, 346/74 MT

[51] Int. Cl. ................................................G11b 5/86

[58] Field of Search ..............179/100.2 CR, 100.2 E; 346/74 MT

[56] References Cited

UNITED STATES PATENTS 3,496,304 2/1970 Nelson ................179/100.2 E

*Primary Examiner*—J. Russell Goudeau

*Attorney*—Charles M. Hogan et al.

[57] ABSTRACT

The disclosure illustrates a method and apparatus for thermomagnetically and magnetically transferring short and long wavelength signals from a master magnetic tape to a pair of magnetizable layers of an intermediate carrier. The signal on the intermediate carrier subsequently is transferred to a copy tape either magnetically or thermomagnetically.

15 Claims, 3 Drawing Figures

INVENTOR.
PHILIP SMALLER
BY
Charles M. Hogan
Gary M. Moran
ATTORNEYS.

DOUBLE TRANSFER TAPE COPY SYSTEM

The present invention relates to the transfer of recorded information from a master magnetic storage medium to a copy storage medium.

In recent years the direct transfer of magnetic signals from a master tape to a copy tape has been proposed. In this method the master and copy medium are brought into intimate contact in the presence of a magnetic bias field. This approach requires a master tape having a higher coercivity than the copy tape to avoid erasing the magnetic signal on the master tape.

A method for avoiding the problem of a special master tape having a higher coercivity than the copy tape is found in U.S. Pat. No. 3,496,304 entitled "Double Transfer Curie Point and Magnetic Biased Tape Copy System." In this patent a master tape is brought into direct contact with an intermediate carrier heated to its paramagnetic state. The intermediate carrier is cooled and it reverts to its ferromagnetic state during contact with the master tape. During this intimate contact the intermediate carrier is magnetized by the magnetizing force of the master tape. As the intermediate carrier cools, this magnetization remains but the hysteresis loop expands and the remnant magnetization of the intermediate carrier increases accordingly. The signal on the intermediate carrier is strong enough to enable it to be transferred to a copy tape having the same coercivity as the master tape and subsequently brought into contact with the intermediate carrier in the presence of a magnetic bias.

While this approach permits the use of master and copy tapes of the same coercivity, it lacks the efficient reproduction of low frequency magnetic signals.

Accordingly, it is an object of the present invention to efficiently transfer magnetic signals from a master to a copy tape and particularly to efficiently transfer low frequency magnetic signals.

These ends are accomplished by using a two-layer intermediate carrier which is placed in contact with a master magnetic storage medium. During contact the first layer is allowed to revert from a paramagnetic to a ferromagnetic state and the second layer is biased with a magnetizing force insufficient to erase the signal on the master tape. The signal on the intermediate carrier is then copied onto a copy magnetic storage medium.

The above and other related objects and features of the present invention will be apparent from a reading of the description of the disclosure shown in the accompanying drawing and the novelty thereof pointed out in the appended claims.

Figure 1:
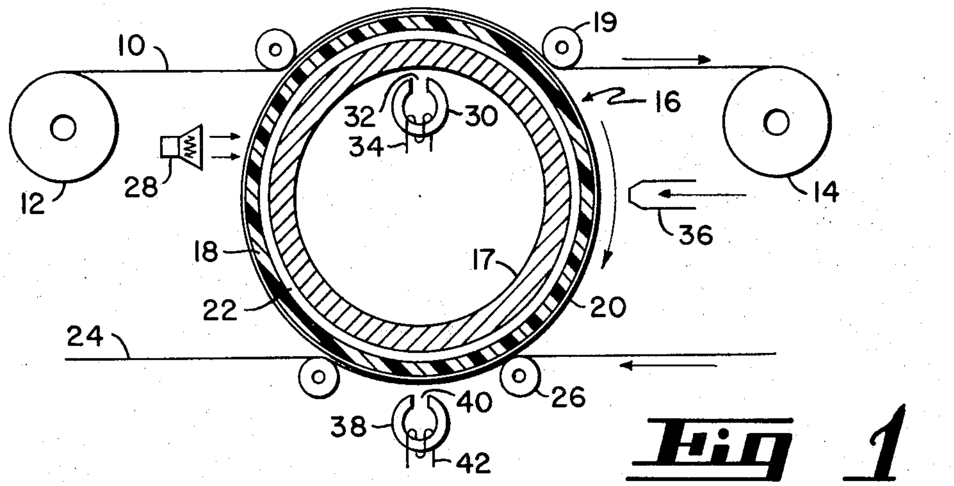
FIG. 1 is a simplified schematic showing of a tape transfer system embodying the present invention.

Referring now to FIG. 1 there is shown a tape transfer system for copying magnetic signals from a master tape 10. The master tape 10 is transferred from a supply drum 12 to a take-up drum 14 by a suitable drive arrangement. The master tape 10 comprises a nonmagnetic polyester film backing or other substance having a layer of magnetizable material such as iron oxide particles or similar ferromagnetic material. As shown herein, the master tape has a single magnetizable layer. However, a double-coated tape similar to the one shown on copending patent application Ser. No. 185,136 filed Sept. 30, 1971 entitled "Double Layer Magnetic Storage Medium," in the name of Philip Smaller, may be used with equal, if not improved, results. The master tape 10 is held in slippage-free contact with an intermediate magnetic storage carrier generally indicated by reference character 16 by a pair of guide rollers 19. A copy tape 24 is placed in slippage-free contact to a second portion of the intermediate storage carrier 16 by guide rollers 26. The intermediate carrier 16 is shown in the form of a drum, but it may also be a flexible endless belt or other configuration. As shown particularly in FIG. 2, the intermediate carrier 16 comprises a nonmagnetic base material 18 having a relatively thin outside layer 20 and a thicker inner layer 22. In actual practice the total thickness of the drum 16 is insufficient to be self supporting. A rigid annular base 17 then provides a support for layers 20, 22 and base 18.

A radiant heat source 28 heats the outer layer 20 to a predetermined temperature level before it is placed in slippage-free contact with the master tape 10 where a heat transfer takes place and the layer 20 is cooled. During the contact period the inner coating 22 is magnetically biased by a core 30 defining a gap 32 and having a coil of wire 34 through which A-C current is passed. An alternating magnetic field exists across the gap 32 and magnetically biases the inside coating. A cooling air source from a nozzle 36 impinges on layer 20 to further cool it after slippage-free contact with the master tape. A second core 38 defining a gap 40 is positioned adjacent the copy tape 24 where it contacts the storage carrier 16. A coil of wire 42 carries A-C current which generates an alternating magnetic field across gap 40 to magnetically bias the copy tape 24.

The outer layer 20 has a predetermined Curie point not higher than the Curie point for the master tape 10. What is required is that the Curie point of the master tape and the Curie point of layer 20 be such that heating layer 20 by radiant heat source 28 places it in a paramagnetic state and that the contact of heated layer 20 with the master tape 10 does not place the master tape in the paramagnetic state. If the layer 20 is relatively thin relative to master tape 10, the selection of materials having equal Curie points is possible. This is because the thermal capacitance of master tape 10 is much greater than that for layer 20. The heat transfer upon contact quickly cools layer 20 without appreciably raising the temperature of master tape 10.

Layer 20 must also have a coercivity, when in a nonheated state, above the coercivity of the copy tape 24. This prevents erasure of the magnetic field on layer 20 by the magnetic bias of copy tape 24 as the magnetic signals are transferred to it. A suitable material for layer 20 is chromium dioxide $CrO_2$ which has a Curie point of below 140° C. This is in contrast to a conventional ferrite master tape which has a Curie point of close to 500° C. The coercivity of the first layer 20 is over 500 oersteds, which is well above the coercivity of conventional copy tapes 24.

The inside coating 22 is formed from a material having a high coercivity, such as ferrous oxide, and a Curie point sufficiently high to remain in a ferromagnetic state while the outer layer 20 is in a paramagnetic state.

During operation both the master tape 10 and the copy tape 24 are moved into slippage-free contact with the drum 16. The radiant heat applied to layer 20 raises its temperature above its Curie point and places the layer in a paramagnetic state prior to contact with the master tape 10. Since layer 20 is in a paramagnetic state, it is easily magnetized by the remnant magnetizing force in master tape 10. Because the layer 20 is in intimate contact with the master tape 10, the high frequency magnetic signals are efficiently transferred. The reason for this is that their lines of force do not extend very far and extend primarily through the relatively thin layer 20. At the same time the core 30 magnetically biases inside layer 22 so that it may be magnetized by the long wavelength signals emanating from tape 10. The magnetizing force across gap 32 is selected so that it is insufficient to erase the magnetic signals found on the master tape 10. The spacing of the layer 22 from the master tape 10 by the intermediate base 18 significantly contributes to this feature. This spacing greatly attenuates the magnetic field that tends to act on the master tape 10.

During the contact period the first layer 20 reverts to a ferromagnetic state and its remnant magnetization increases. The return to the ferromagnetic state is added by the cooling air from nozzle 36. After the outer layer 20 is in the ferromagnetic state the copy tape 24 is placed into slippage-free contact with the drum and magnetically biased so that it is magnetized with the signal from the intermediate storage carrier. As the drum is heated by the radiant heat element 28, its erases the signals on the outer layer 20 and the signals on the inner layer 22 are erased by the magnetic field across gap 32.

The utilization of the two-layer intermediate drum enables a significant improvement in the quality of the signals transferred because it greatly increases the efficient transfer of long wavelength signals which has heretofore been unattainable with prior art magnetic transfer techniques. This increase in transfer efficiency is obtained with no enhancement in the distortion components. The spacing acts to attenuate the distortion components.

Figure 3:
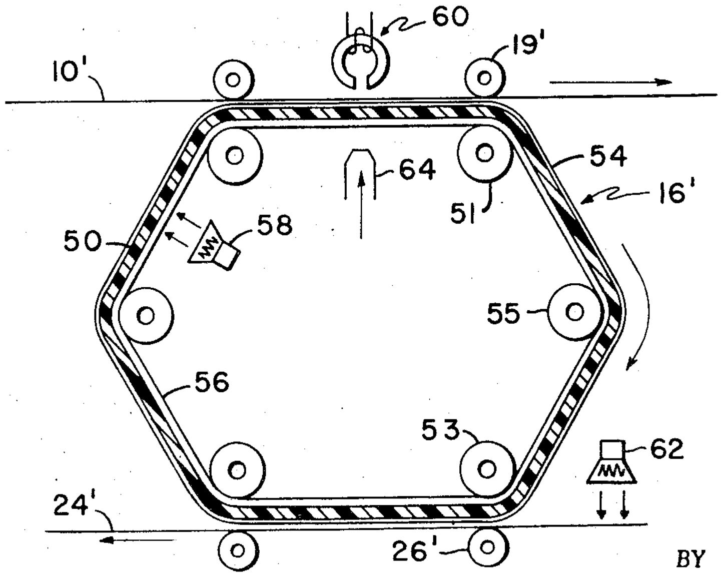
FIG. 3 is a different embodiment of the tape transfer system of FIG. 1.

FIG. 3 shows another embodiment of the present invention utilizing a two-layer intermediate carrier but wherein the carrier is comprised of an intermediate flexible endless belt 50 having a relatively thin outer layer 54 and a relatively thick inner layer 56. Belt 50 is guided by rollers 51, 53 and 55. Rollers 51 and 53 cooperate with rollers 19′ and 26′, respectively, to hold the belt in slippage-free contact with master and copy tapes 10′ and 24′, respectively.

Figure 2:
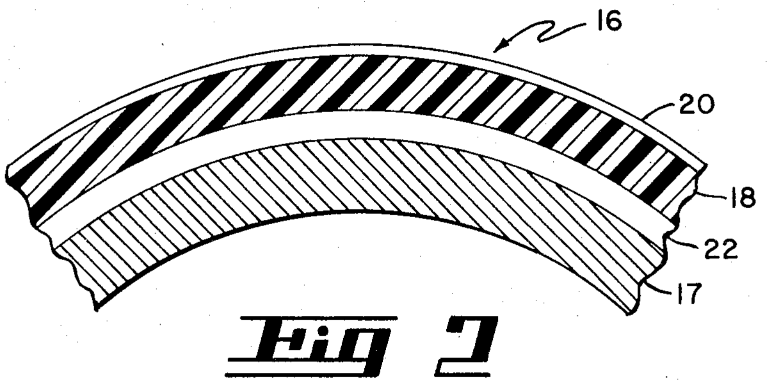
FIG. 2 is a fragmentary enlarged view of an intermediate storage carrier of the tape transfer system shown in FIG. 1.

Layer 54 is a material similar to the material for layer 22 of FIG. 2. Inner layer 56 is a material having properties similar to those for layer 20 of FIG. 2. The master tape 10′ has a higher coercivity than layer 54 and the copy tape 24′ has a relatively low Curie point. A radiant heat element 58 is positioned on the inside of the belt so as to heat up layer 56. A magnetic biasing device 60 is located on the outside of the belt where it contacts master tape 10′. A second radiant heat element 62 acts on copy tape 24′ prior to contact with the periphery of layer 54.

In this operation, while the magnetic master tape 10′ is in contact with belt 16′, the magnetic bias on layer 54 causes it to be magnetized with the short wavelength signals from the master tape 10′. At the same time the radiant heat element 58 places inner layer 56 in a paramagnetic state so that it is easily magnetized by the long wavelength signals emanating from master tape 10′. Cooling air through a nozzle 64 directed against layer 56 cools it to the ferromagnetic state.

When the belt 16′ is placed in contact with the copy tape 24′ the copy tape 24′ is heated by the radiant heat element 62 to a level above its Curie point. Copy tape 24′ has a Curie point sufficiently low to permit it to be in a paramagnetic state while layers 54 and 56 remain in a ferromagnetic state. During this condition tape 24′ is easily magnetized. Subsequent cooling of the copy tape 24′ while it is in contact with the belt 16′ causes the remnant magnetization to increase and a magnetic signal to be retained on the tape. This embodiment enables excellent reproduction of both the low and the high frequency signals found on the master tape 10′.

The magnetic signals may be transferred from the master tape 10 to the copy tape 24 in still another fashion. In this arrangement the low Curie point, thin layer of the intermediate carrier contacts the master and copy tapes while the high coercivity thicker layer is spaced from the tapes. The transfer to the low Curie point layer is thermomagnetic and the transfer to the high coercivity layer is by magnetic bias. The transfer to the intermediate carrier is substantially like the transfer shown in FIG. 1. The transfer from the intermediate carrier to the copy tape, however, is substantially like the thermomagnetic transfer of FIG. 3, where the copy tape 24′ is heated to a paramagnetic state and allowed to revert to a ferromagnetic state while in contact with the intermediate carrier. The low Curie point layer and the copy tape have predetermined Curie points that permit the copy tape to be in a paramagnetic state while both layers of the intermediate carrier remain in a paramagnetic state. It is possible to accomplish this result even when the low Curie point layer and the copy tape have the same Curie point. The reason for this is that thermal transfer from the heated copy tape cools it below its Curie point before the low Curie point layer can be heated to a level above its Curie point.

In all of the methods described above, the efficient transfer of both short and long wavelength signals is accomplished by a combination of thermomagnetic and magnetic transfer of signals from a master tape to a two-layer intermediate carrier.

In one instance the short wavelength signals are transferred thermomagnetically and the long wavelength signals transferred magnetically. In the other instance the short wavelength signals are transferred magnetically and the long wavelength signals thermomagnetically. It should be apparent to those skilled in the art that both of these approaches provide an opportunity to enhance the transfer efficiency over a wide range of signal wavelengths without an increase in the distortion of the signal.

The transfer method of FIG. 1 illustrates an intermediate carrier in the form of a drum and the method of FIG. 3 shows an endless belt. Both forms of intermediate carriers may be interchangeably used with the three transfer approaches described, as is apparent to those skilled in the art.

While the preferred embodiment of the present invention has been described, it should be apparent that further modifications may be made without departing from the spirit and scope of the present invention.

Having thus described the invention, what is novel and desired to be secured by Letters Patent of the United States is:

1. Apparatus for the transfer of magnetic recordings on a master magnetic storage medium onto a copy magnetic storage medium, said apparatus comprising:
an intermediate storage carrier comprising a first layer having a relatively low Curie point not higher than that of the master storage medium and having a coercivity above the coercivity of the copy storage medium and a second layer having a Curie point sufficiently high that it will remain in a ferromagnetic state while the first layer is in the paramagnetic state;
means for positioning the intermediate carrier in contact with said master storage medium while the first layer is in a paramagnetic state and maintaining that contact while the first layer reverts to a ferromagnetic state;
means for providing a magnetic bias for the second layer of said intermediate carrier while in contact with said master storage medium, the magnetizing force of said magnetic bias being insufficient to erase the magnetic recordings on said master storage medium;
means for copying the magnetic recordings on said intermediate storage carrier onto said copy storage medium.

2. Apparatus as in claim 1 wherein said copying means comprises:
means for placing the intermediate carrier into contact with said copy storage medium subsequent to contact with said master storage medium; and
means for magnetically biasing the copy storage medium while in contact with the intermediate carrier.

3. Apparatus as in claim 2 wherein:
said intermediate storage carrier includes a drum of nonferrous material having said first layer on the outside and said second layer on the inside;
means for providing the magnetic bias for the second layer of material; and
said apparatus further comprises means for heating said first layer to a paramagnetic state positioned on the outside of said drum.

4. Apparatus as in claim 1 further comprising means for heating said first layer prior to contact of said intermediate storage carrier with said master storage medium.

5. Apparatus as in claim 4 wherein said first layer is relatively thin whereby it heats to the paramagnetic state and cools to the ferromagnetic state in a relatively short period of time.

6. Apparatus as in claim 1 wherein said first layer is comprised of chromium dioxide and said second layer is comprised of ferrite material. 7. Apparatus as in claim 1 wherein:
said first layer contacts said master storage medium;
said second layer is spaced from said first layer to attenuate the bias field acting on said master storage medium and decrease distortion components while said intermediate carrier is in contact with said master storage medium.

8. Apparatus as in claim 1 wherein said master storage medium has a higher coercivity than said copy medium and wherein said means for copying the recordings onto said copy storage medium comprises:
means for placing the first layer of said intermediate carrier in contact with said copy storage medium while said copy storage medium is in a paramagnetic state and maintaining that contact while the copy storage medium reverts to a ferromagnetic state, said first layer and said copy storage medium having predetermined Curie points permitting said copy medium to be in a paramagnetic state while said first and second layers remain in a ferromagnetic state.

9. Apparatus as in claim 1 wherein said master storage medium has a higher coercivity than said second layer medium and wherein:
said second layer of said intermediate carrier is placed in contact with said master storage medium and magnetically biased;
said means for copying the recordings onto said copy storage medium comprises:
means for placing the second layer of said intermediate carrier in contact with said copy storage medium while said copy storage medium is in a paramagnetic state and maintaining that contact while the copy storage medium reverts to a ferromagnetic state, said copy storage medium having a predetermined Curie point permitting said copy to be in a paramagnetic state while first and second layers remain in a ferromagnetic state.

10. Apparatus as in claim 9 further comprising means for heating the first layer of said intermediate carrier to a temperature level during which the first layer is in its paramagnetic state.

11. Apparatus as in claim 1 wherein said intermediate carrier comprises an endless flexible belt of nonmagnetic material, said first layer being on the inside of said belt and the second layer being on the outside of said belt.

12. A method for transferring magnetic recordings from a master magnetic storage medium to a copy magnetic storage medium, said method comprising the steps of:
placing an intermediate storage carrier having first and second magnetizable layers into slippage-free contact with the master storage medium while the first layer of said intermediate storage carrier is in a paramagnetic state and the second layer remains in a ferromagnetic state and maintaining that contact while the first layer reverts to a ferromagnetic state;
magnetically biasing the second of said layers while said intermediate storage carrier is in contact with said master magnetic storage medium, the magnetizing force of said magnetic bias being insufficient to erase the magnetic recordings on said master storage medium;

separating the intermediate storage carrier from the master magnetic storage medium after the first layer of the intermediate storage carrier has reverted from the paramagnetic to the ferromagnetic state; and subsequently copying the magnetic recordings on said intermediate storage carrier onto said copy storage medium.

13. A method as in claim 12 wherein said copying of the magnetic recordings on said intermediate storage carrier onto said copy storage medium comprises the steps of:

placing the intermediate carrier in contact with the copy magnetic storage medium and magnetically biasing the copy storage medium when in contact with the intermediate storage carrier; and subsequently separating the intermediate storage carrier from the copy magnetic storage medium.

14. A method as in claim 12 wherein the copying of the magnetic recordings on the intermediate storage carrier onto said copy storage medium comprises the steps of:

placing the second layer of said intermediate carrier in contact with said copy storage medium while said copy storage medium is in a paramagnetic state and maintaining that contact while the copy storage medium reverts to a ferromagnetic state, said copy storage medium having a predetermined Curie point permitting said copy medium to be in a paramagnetic state while said first and second layers remain in a ferromagnetic state.

15. A method as in claim 12 wherein the copying of the magnetic recording on the intermediate storage carrier onto said copy storage medium comprises the steps of:

placing the first layer of said intermediate carrier in contact with said copy storage medium while said copy storage medium is in a paramagnetic state and maintaining that contact while the copy storage medium reverts to a ferromagnetic state, said first layer and said copy storage medium having predetermined Curie points permitting said copy medium to be in a paramagnetic state while said first and second layers remain in a ferromagnetic state.

* * * * *